Patented Nov. 28, 1933

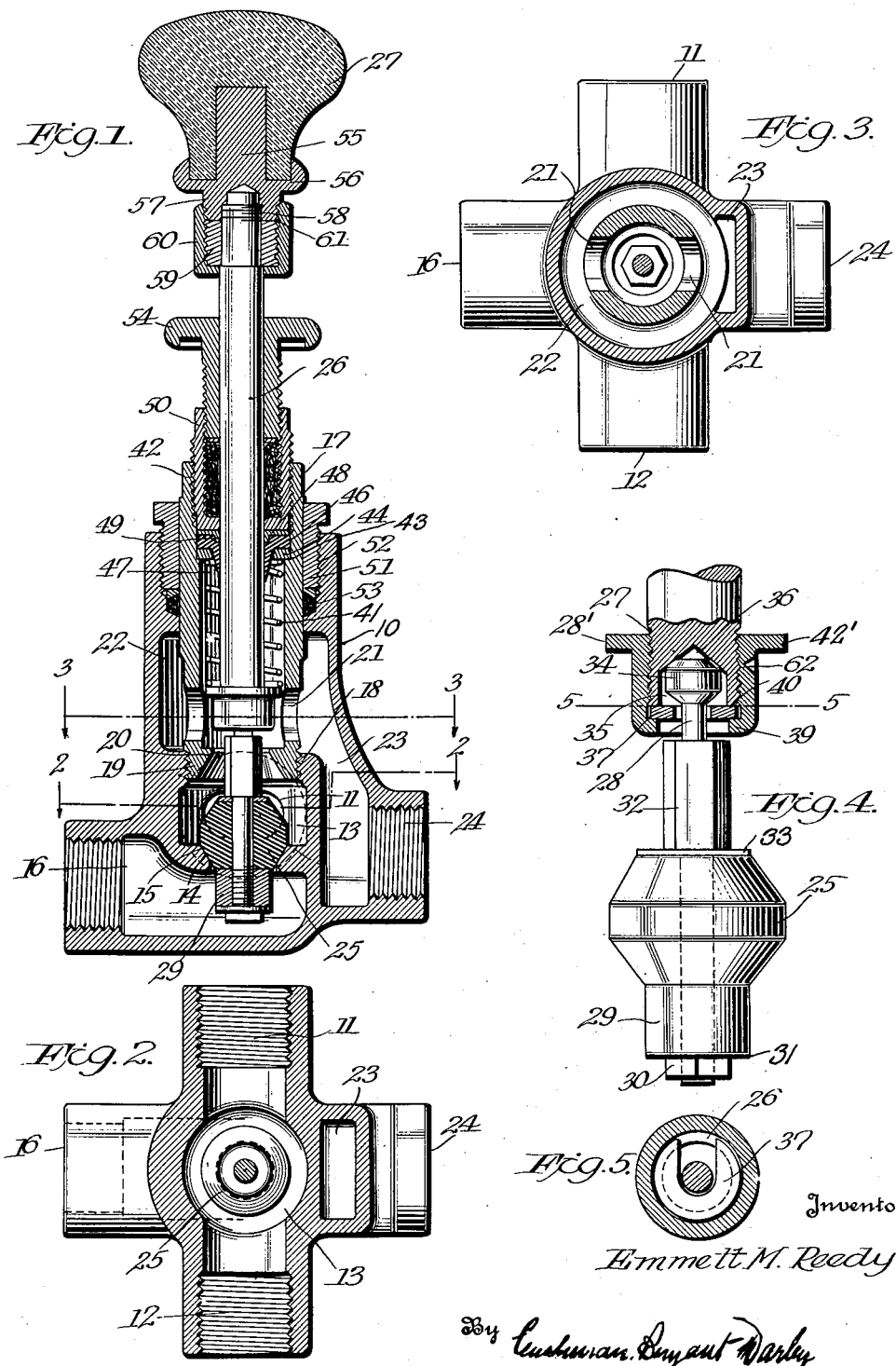

1,937,246

UNITED STATES PATENT OFFICE 1,937,246

DIVERTER VALVE

Emmett M. Reedy, Decatur, Ill., assignor to Mueller Co., Decatur, Ill., a corporation of Illinois Application August 5, 1929. Serial No. 383,517

12 Claims. (Cl. 251—22)

This invention relates to what is commonly known as a diverter valve, that is to say, a valve such as shown and described in the patent to Philip Mueller 1,532,434, wherein a single valve is employed for diverting either hot or cold water to the tub or shower attachment respectively in the usual bathroom.

It is contemplated to provide a valve employing resilient means to maintain it in a normal position and the pressure of the water to maintain it in a second diverting position against the action of the resilient means and to this end it is essential that the valve stem be packed to make a tight joint and at the same time permit free movement of the stem under the action of the resilient means.

It is likewise essential in a valve of this type which is maintained in one of its diverting positions by water pressure, that the back pressure of the water may be utilized to hold the valve in the diverting position so long as the water pressure is on.

Since in diverter valves of this type a single double cone valve is usually employed, some difficulty is found where the seats are machined in securing a proper seating of the valve and I overcome this objection and provide a thoroughly reliable seating arrangement by giving the valve a universal mounting with respect to the valve stem.

In the drawing,

Figure 1 is a sectional view.

Figure 2 is a section on the line 2—2 of Figure 1.

Figure 3 is a section on the line 3—3 of Figure 1.

Figure 4 is a detail view partly in section, and

Figure 5 is a sectional detail view.

Referring to the drawing, the valve casing is indicated at 10 and comprises inlet ports 11 and 12 respectively for hot and cold water. These ports deliver into a chamber 13 in the valve casing, the lower wall of which chamber is provided with a port 14 having a valve seat 15 formed therein. The port 14 communicates with a passage 16 which delivers to a suitable connection for the shower attachment.

A sleeve 17 is threaded into the upper end of the chamber 13 as shown at 18, which sleeve at its lower end is provided with a port 19 formed to provide a valve seat 20. The sleeve above the valve seat is hollow as shown and is provided with a plurality of ports 21. These ports communicate with an upper chamber formed in the casing and indicated at 22, which chamber communicates with a downwardly extending passage 23 to the outlet 24 leading to the tub faucet.

The valve 25 which, as shown, is a double cone valve is carried by a valve stem 26 in a manner which will presently be described and connected to the stem 26 is a suitable handle 27.

Referring to Figure 4, it will be noted that the valve is mounted upon a relatively thin stem 28 and at one end there is threaded upon the said stem a cylindrical projection 29. A nut 30 and washer 31 may be employed to hold the several parts in position. The stem on the opposite side of the valve is provided with an enlargement 32 and a washer 33 is swaged over this enlargement and against the upper cone of the valve 25, whereby the valve is held in position by the washer 33 and the cylindrical enlargement 29. The stem 28, it will be noted, is formed with an enlarged head 34, as shown in Figure 4. This head may be double conical as shown or may have a different configuration, but I prefer the double conical form illustrated.

The main stem 26 is formed with a recess in its lower end indicated at 35, which terminates in a conical portion 36. The main stem 26 is exteriorly threaded as at 27 and a coupling nut 28' is employed for coupling the valve 25 and its stem 28 to the main stem 26. In order to accomplish this coupling and provide for universal movement of the valve, a U-shaped and preferably flat washer 37 is slipped about the upper end of the stem 28, as shown in Figure 4 and the coupling nut 28' is then applied to the threaded portion 27 of the lower end of the valve stem so as to bind the washer 37 firmly between the flanged end 39 of the coupling nut and the end 40 of the main stem 26. In this manner, it will be observed that notwithstanding the valve seats in the chamber of the casing may not be exactly machined, the valve will have such universal movement as will permit it to properly seat in either of its two positions. Moreover, it will be noted that this is possible through the free engagement of the stem 28 and head 34 with the main valve stem whereby the valve may rotate and have a universal movement, since the head 34 is cone-shaped and engages the cone 36 of the main valve stem and likewise may move about upon the washer 37.

Mounted in the casing and within the sleeve 17 is a spiral spring 41, which at its lower end is adapted to engage against the enlarged flange portion 42 of the coupling nut 28, as shown in Figure 1.

The sleeve, it will be noted, is threaded at its upper end partially as shown at 42 and has an enlarged interior diameter which terminates at 43 to form an interior recess. Disposed in this recess is a flat metal washer 44 having an enlarged opening therein through which the stem 26 passes. Mounted above the flat washer 44 is a hat washer 46 having an opening therein slightly larger than the diameter of the valve stem 26 which passes through it. This hat washer, it will be noted, has a flat base portion and a downwardly extending circular projecting portion 47, which extends through the central opening in the metal washer 44. The hat washer 46 is preferably made of rubber or some suitable packing material. The hat washer 46 is tapered, as shown, so as to have a feather edge in order that the water pressure will compress it about the stem and thus render it absolutely water tight.

Disposed above the hat washer is a second metal washer 48 having an opening therein slightly larger than the diameter of the stem 26, which passes through it and having a downwardly projecting circular portion 49, which engages within a circular recess formed in the upper portion of the base of the hat washer. A glad nut 50 is exteriorly threaded to engage the threaded portion on the interior end of the sleeve 17 and acts to clamp the hat washer between the two metal washers 44 and 48.

By reason of the use of this particular packing including a hat washer, it is possible for the stem to slide satisfactorily and, at the same time, a water proof packing is provided. It is essential that a tight packing be employed, since it will be noted that the upper portion of the sleeve is in communication with the chamber 22 of the valve casing and hence were it not water tight, water would find its way upward past the stem and be very objectionable.

With the present construction, however, the resilient metal washers and the rubber hat washer effectively seal the upper portion of the casing against any fluid leaks.

A packing nut 51 slides over the sleeve 17 and has threaded engagement with the upper end of the casing as shown at 52, suitable packing 53 being interposed between the end of the packing nut and the adjacent portions of the casing and sleeve to prevent water leaking exteriorly about the sleeve.

The nut 54 is provided for positioning the usual escutcheon member (not shown) and it will be observed that it engages the interior threaded portion of the glad nut 50. This nut 54 is adjustable upon the glad nut and about the stem 26.

The handle or knob indicated at 27 has embedded in it a metallic shank 55. This shank is preferably formed with a recess to receive the smaller portion of the handle as shown at 56 and is provided with a projecting exteriorly threaded portion 57. This projecting portion is interiorly threaded and the stem 26 may have a similar threaded portion to engage in the threaded recess of the knob supporting member as shown at 58. Threaded about the upper end of the stem 26 is a nut 59 having exterior threads to receive a coupling nut 60. This coupling nut engages the exterior threads of the concealed nut 59 and also an exteriorly threaded portion 61 on the projection of the knob carrying member. In this manner a very effective means is provided for attaching the knob to the valve stem 26, it having been found that in many cases diverter valves have proven unsatisfactory because the knob or handle member becomes loose and, of course, interferes with proper actuation.

This is extremely important, of course, in connection with a diverter valve used with shower baths, since it may be necessary to cut off the shower to prevent scalding and an absolutely fool proof construction is necessarily demanded.

Referring to Figures 1 and 4, it will be noted that the projection 29 is of a diameter slightly less than the smallest diameter of the port 14. Both the ports 14 and 19 are conical as shown and terminate at their outlet ends in substantially straight cylindrical portions. By having the projection 29 of slightly less diameter than the smallest diameter of the port 14, the flow to the shower is restricted and a back pressure is built up, which will effectively maintain the valve in open or rested position against the action of the spring.

The operation of the diverter valve will now be briefly described. In the normal position of the valve shown in Figure 1, water supplied from either the hot or cold supply connections i. e. from the usual main will enter the respective inlets 11 and 12 to the chamber 13. The water will thereupon, since the valve is seated in the valve seat 15, pass upwardly into the sleeve and out through the ports 22 down through the passage 23 to the outlet 24 and thence to the tub. The spring, it will be noted, bears against the metal washer 44 and exerts its pressure upon the flange 42' of the coupling nut 28', so that normally the valve is always maintained seated against the valve seat 15 and water will thus pass to the bath tub.

In order, however, to supply water through the shower attachment, it is merely necessary to pull upon the knob 27, whereupon the valve will be unseated from the seat 15 and seated against the seat 20 in the lower end of the sleeve. The water entering the chamber 13, because of the restricted opening permitted through the port 14 by reason of the pressure of the projection 29 therein, will build up a sufficient back pressure to maintain the valve seated in the seat 20, so long as the water pressure is on and water will, of course, pass through the restricted space between the cylindrical projection 29 and the wall of the port 14 to the passage 16 and thence to the shower.

It will be understood that by reason of the free and universal mounting afforded the valve in the main valve stem that it will seat regardless of the irregularities in the machining of the seats 15 and 20. Moreover, because of the size of the cylindrical projection 29 a restricted flow is permitted from the chamber 13 to the passage 16, whereby a sufficient back pressure is built up to maintain the valve seated against the seat 20 when the shower is being used.

It will, moreover, be seen that the valve stem 26 may slide freely through the hat washer 46 and metal washer 48, as well as the glad nut 50 and at the same time a safe and secure packing and seal is provided. Moreover, it will be noted that the spring is confined on the one hand by the flange 42 of the coupling nut 28 and on the other hand by the metal washer 44, which serves as one of the clamping means for the hat washer. In the present construction, the two inlet ports 11 and 12 are in alignment, but it has been found most satisfactory to dispose the outlet ports out of alignment with each other and out of alignment with the respective inlet ports.

The invention provides a satisfactory solution to the heretofore vexing problem of providing a leak-proof reliable diverter valve, since it will be noted that the packing structure comprised in the hat washer and associated parts will allow the valve stem 26 to slide freely and no possibility is afforded for the valve sticking against the action of the spring 41.

Referring to Figure 4, the nut 28 is preferably provided with a lock thread 62, whereby the connection between the nut and the lower end of the valve stem 26 may be positive and no likelihood of the parts becoming disengaged is possible.

Various modifications may be resorted to, all of which are considered to be comprehended within the scope of the appended claims.

What I claim is:

1. A diverter valve comprising a casing; supply inlets; an internal sleeve defining with the casing a valve chamber; outlet ports communicating with said chamber and sleeve; a reciprocable valve having a valve stem extending through said sleeve; a spring normally maintaining said valve in one position, closing one of said ports; and means associated with the valve for causing a back pressure to be built up in the valve chamber to hold the valve in position, closing the other port against the action of said spring.

2. A diverter valve comprising a casing; supply inlets; an internal sleeve defining with the casing a valve chamber; outlet ports communicating with said chamber and sleeve; a reciprocable valve having a valve stem extending through said sleeve; a spring normally maintaining said valve in one position, closing one of said ports; and means associated with the valve for causing a back pressure to be built up in the valve chamber to hold the valve in position, closing the other port against the action of said spring; said means comprising an elongated portion of less diameter than the adjacent outlet port and being disposed to restrict flow through the port when the valve is reciprocated to divert the flow.

3. A diverter valve comprising a casing; supply inlets; an internal sleeve defining with the casing a valve chamber; outlet ports communicating with said chamber and sleeve; a reciprocable valve having a valve stem extending through said sleeve; a spring normally maintaining said valve in one position, closing one of said ports; and means associated with the valve for causing a back pressure to be built up in the valve chamber to hold the valve in position, closing the other port against the action of said spring; said means comprising an elongated portion carried by the stem and of less diameter than the adjacent outlet port; said portion being disposed substantially within said port to restrict flow therethrough when the valve is reciprocated to divert the flow.

4. A diverter valve comprising a casing; supply inlets; an internal sleeve defining with the casing a valve chamber; outlet ports communicating with said chamber and sleeve; a reciprocable valve having a valve stem extending through said sleeve; a spring normally maintaining said valve in one position, closing one of said ports; a packing about the stem associated with said sleeve and forming a bearing for said spring; and means associated with the valve for causing a back pressure to be built up in the valve chamber to hold the valve in position, closing the other port against the action of said spring.

5. A diverter valve comprising a casing; supply inlets; an internal sleeve defining with the casing a valve chamber; outlet ports communicating with said chamber and sleeve; a valve having a universal connection with its stem and reciprocable within the casing and sleeve; a spring normally maintaining said valve in one position, closing one of said ports; a packing about the stem associated with said sleeve and forming a bearing for said spring; and means associated with the valve for causing a back pressure to be built up in the valve chamber to hold the valve in position, closing the other port against the action of said spring.

6. A diverter valve comprising a casing; supply inlets; an internal sleeve defining with the casing a valve chamber; outlet ports communicating with said chamber and sleeve; a valve having a universal connection with its stem and reciprocable within the casing and sleeve; said valve stem comprising two parts; one of which carries the valve and has universal movement in a recess in the other part; a spring normally maintaining said valve in one position, closing one of said ports, a packing about the stem associated with said sleeve and forming a bearing for said spring; and means associated with the valve for causing a back pressure to be built up in the valve chamber to hold the valve in position, closing the other port against the action of said spring.

7. A diverter valve comprising a casing; supply inlets; an internal sleeve defining with the casing a valve chamber; outlet ports communicating with said chamber and sleeve; a valve having a universal connection with its stem and reciprocable within the casing and sleeve; said valve stem comprising two parts; one of which carries the valve and has universal movement in a recess in the other part; said recess being enlarged and having a conical portion and the valve carrying part having an enlarged head provided with double cone engaging in said recess; a U-shaped washer carried by said valve carrying part and engaging the lower end of the other part and a clamping nut adjustably threaded to the lower end of one of the parts and acting to clamp the washer in position to freely confine the head within the recess; a spring normally maintaining said valve in one position, closing one of said ports; a packing about the stem associated with said sleeve and forming a bearing for said spring and means associated with the valve for causing a back pressure to be built up in the valve chamber to hold the valve in position, closing the other port against the action of said spring.

8. A diverter valve comprising a casing; supply inlets; an internal sleeve defining with the casing a valve chamber; outlet ports communicating with said chamber and sleeve; a valve having a universal connection with its stem and reciprocable within the casing and sleeve; said valve stem comprising two parts; one of which carries the valve and has universal movement in a recess in the other part; said recess being enlarged and having a conical portion and the valve carrying part having an enlarged head provided with a double cone engaging in said recess; a U-shaped washer carried by said valve carrying part and engaging the lower end of the other part and a clamping nut adjustably threaded to the lower end of one of the parts and acting to clamp the washer in position to confine the head within the recess; a spring normally maintaining said valve in one position, closing one of said ports; said nut forming a bearing for one end of the spring and means associated with the valve for causing a back pressure to be built up in the valve chamber to hold the valve in position, closing the other port against the action of said spring.

9. A diverter valve comprising a casing; supply inlets; an internal sleeve defining with the casing a valve chamber; outlet ports communicating with said chamber and sleeve; a reciprocable valve; a spring normally maintaining said valve in one position, closing one of said ports; a packing about the stem associated with said sleeve and forming a bearing for one end of said spring; said valve having a universal connection with its stem; said connection providing the other bearing for said spring; and means associated with the valve for causing a back pressure to be built up in the valve chamber to hold the valve in position, closing the other port against the action of said spring.

10. A diverter valve comprising a casing; supply inlets; an internal sleeve defining with the casing a valve chamber; outlet ports communicating with said chamber and sleeve; a reciprocable valve having its valve stem extending through said sleeve; a spring normally maintaining said valve in one position, closing one of said ports; a packing about the stem associated with said sleeve and forming a bearing for one end of said spring; said valve having a universal connection with its stem; said connection providing the other bearing for said spring; said packing comprising a flexible hat washer clamped to said sleeve by means arranged above and below the washer and embracing the stem and means associated with the valve for causing a back pressure to be built up in the valve chamber to hold the valve in position, closing the other port against the action of said spring.

11. A diverter valve comprising a casing; supply inlets; an internal sleeve defining with the casing a valve chamber; outlet ports communicating with said chamber and sleeve; a reciprocable valve having its valve stem extending through said sleeve; a spring normally maintaining said valve in one position, closing one of said ports; a packing about the stem associated with said sleeve and forming a bearing for one end of said spring; said valve having a universal connection with its stem; said connection providing the other bearing for said spring; said packing means being received in a recess in the sleeve and comprising a metal washer; a hat washer of flexible material disposed above the metal washer and projecting therethrough to embrace the stem; a second metal washer having a projecting portion engaging within the hat washer and embracing the stem and means for clamping the hat washer between the two metal washers and to the sleeve and means associated with the valve for causing a back pressure to be built up in the valve chamber to hold the valve in position, closing the other port against the action of said spring.

12. A diverter valve comprising a casing; a valve chamber; supply inlets communicating therewith; outlet ports communicating with said chamber; a reciprocable valve in said chamber; a spring normally maintaining said valve in one position, closing one of said ports; and means associated with the valve for causing a back pressure to be built up in the valve chamber to hold the valve in position, closing the other port against the action of said spring.

EMMETT M. REEDY.